March 9, 1948.  C. L. EKSERGIAN  2,437,423
BRAKE CONTROL DEVICE
Filed March 12, 1945
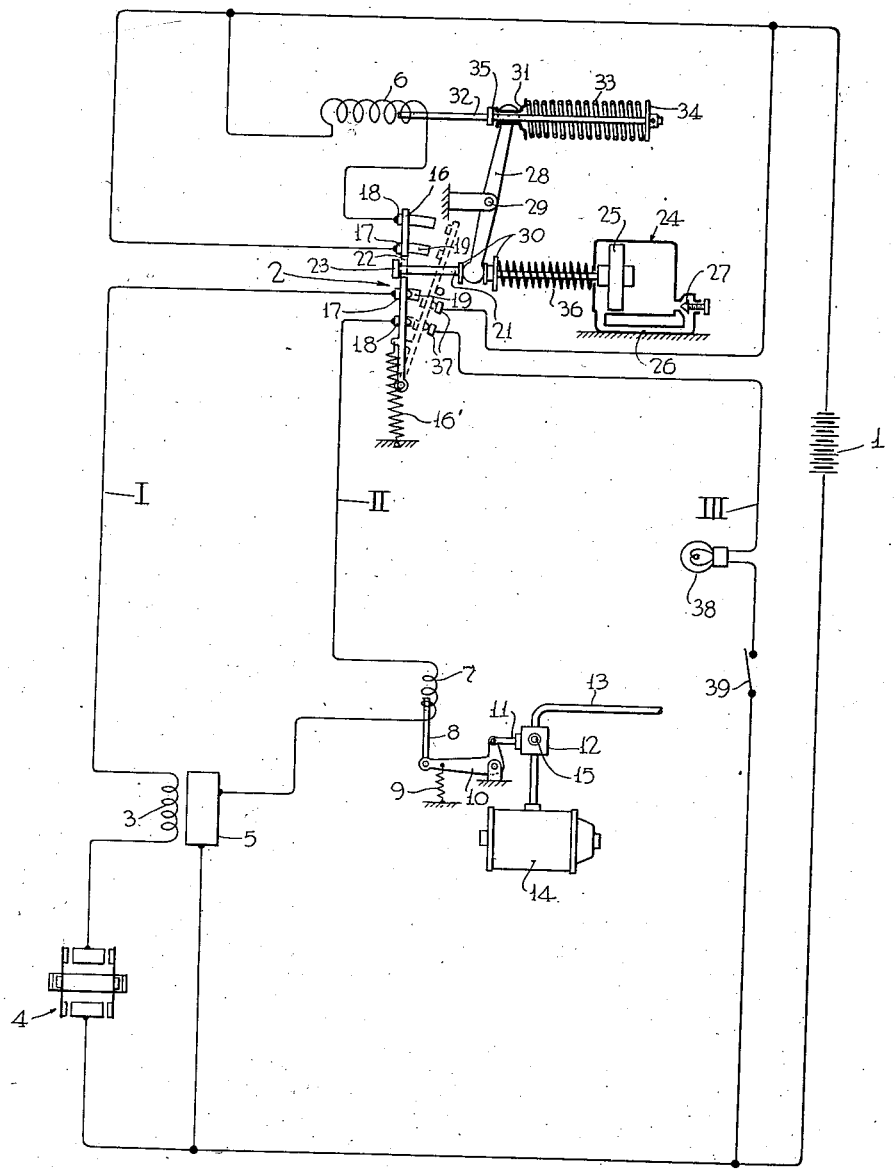
INVENTOR
Carolus L. Eksergian
BY John P. Barbop
ATTORNEY Patented Mar. 9, 1948

2,437,423

UNITED STATES PATENT OFFICE 2,437,423

BRAKE CONTROL DEVICE

Carolus L. Ekserglan, Detroit, Mich., assignor to The Budd Company, Philadelphia, Pa., a corporation of Pennsylvania Application March 12, 1945, Serial No. 582,345

4 Claims. (Cl. 188—181)

The invention relates to a brake control device for preventing wheel slide, of the general class disclosed in Patent No. 2,365,180 for Brake control means, issued December 19, 1944, and more particularly to a safety device for use therewith.

A safety device of this general class is disclosed and claimed in Patent No. 2,426,575, issued August 26, 1947, and entitled Brake control device, and is designed to restore the braking entirely to the operator's control in the event of malfunctioning of the device for preventing wheel slide, so that the brakes will be available in such event. In the device shown and described in the Patent No. 2,426,575 above referred to, no provision is made for conserving the electrical energy of the source for supplying the control circuits of the system, and if the circuits, through short circuit or other malfunctioning, remain closed for an extended period of time after the cut-out of the anti-wheel slide control, much electrical energy is likely to be used up to no avail.

It is therefore a primary object of this invention to provide a control device of this general class in which the electric circuits in the control system are not merely controlled to cut out the control of the brakes by the anti-wheel slide device but all the control circuits of the system are at the same time opened to cut out the source of electrical energy so that no electrical energy is used up by any of the control circuits after their control of the brakes is cut out, due to malfunctioning, and while the malfunctioning persists.

According to one embodiment of the invention the cut-out switch is placed in the circuits which are likely to be held closed an undue length of time due to short circuiting or other malfunctioning and which are energized by a common source of energy, this switch being adapted to be moved to open said circuits upon abnormally prolonged energization thereof due to malfunctioning and thereby also cut out the electrical energy source, means being provided to hold said switch in open position until it is manually reset.

Other and further objects and advantages and the manner in which they are attained will become apparent from the following detailed description when read in connection with the drawings forming a part of this specification.

In the single figure of the drawings is shown a control system according to the invention.

Such a system may comprise, as shown, a primary control circuit, designated generally by I including the source of electrical energy, as battery 1, the cut-out switch, generally designated by 2, the solenoid 3, and the wheel slip responsive switch 4, all arranged in series therein as shown. Normally this circuit is open at the switch 4, but is designed to be closed upon abnormal deceleration or acceleration of the wheel with which it is associated, such as is occasioned by wheel slip, in the manner fully disclosed and claimed in the above referred to Patent No. 2,365,180.

Immediately upon the closing of the switch 4, the solenoid 3 is energized, and this effects the closing of a quick-closing, delayed opening switch, indicated at 5, such as a delayed-opening mercury switch, this switch being arranged in series in a secondary control circuit, designated generally by II, with the common source of energy, battery 1, a solenoid 6, common cut-out switch 2, and a solenoid 7.

Solenoid 7 is thus energized while the relay circuit is held closed by the delayed-opening switch 5 and raises the armature 8 against the tension of spring 9 to operate the bell crank lever 10, one arm of which is pivoted to the lower end of the armature and the other arm of which is pivotally connected to a movable valve member 11 to shift it in the valve casing 12 as to shut off the operator-controlled fluid pressure pipe 13 to the brake cylinder 14 and connecting the cylinder to atmosphere through exhaust port 15.

Thus the fluid pressure in the cylinder is rapidly reduced to stop the wheel slip and is held reduced by the delayed opening of the switch 5 a predetermined time, say, in the neighborhood of one second, which time has been found sufficient to allow the slipping wheel to return to normal speed.

As long as the switches 4 and 5 function normally and are not short-circuited for any reason, which is, of course, most of the time, the control circuits I and II function to protect the braked wheel or wheels from sliding at the called-for braking pressure supplied by the operator-controlled pipe 13.

In normal railway operation, it may happen, however, that one or both of the primary and secondary circuits may be short-circuited for an abnormal predetermined time exceeding the time delay provided by the delayed-opening switch 5, and if this should occur, the cylinder would be exhausted and the operator's control cut-off as long as the short-circuit lasted. Such condition is not only undesirable, but highly dangerous, since the wheel or wheels under the control of the cylinder 14 would then be without brakes.

To prevent such a condition from extending over a long period, a safety device in the form of cut-out switch 2 is provided. This cut-out switch is shown bridging both the primary and secondary circuits, so that its opening opens both circuits simultaneously.

The opening of the switch 2 is controlled by the length of time the secondary circuit II is maintained closed either by the short-circuiting of switch 5, or by the short-circuiting of the primary circuit switch 4. If the secondary circuit is thus held closed over a predetermined period longer than the normal delay period of the delayed-opening switch 5, say in the neighborhood of 5 to 10 seconds, the cut-out switch will be operated to open position, to thereby avoid the undesirable and dangerous condition of no brakes above referred to.

As shown, the switch 2 may comprise a pivoted arm 16 biased to its closed or open position by a tensile spring 16', the axis of which passes from one side to the other of the pivot of the arm 16 when the arm is moved from closed to open position or vice versa. In the drawing the switch arm 16 is shown held in the full line closed position and is indicated in the open position by dotted lines. If the arm is moved to the right a sufficient distance, the spring automatically snaps it over to the dotted line open position and holds it there.

The switch arm 16 carries electrically interconnected pairs of contacts 17, 17 and 18, 18 which engage the respective arcuate terminal contacts 19, 19 of the primary circuit I and 20, 20 of the secondary circuit II, and thus close these circuits while the contacts carried by the arm are in engagement with said arcuate terminal contacts. To take care of the greater arc of movement of the arm at points further removed from its pivot, the arcuate contacts are made of greater length the further they are removed from the pivot of the arm.

To move the switch arm 16 from closed to open position, use is made of a movable plunger 21 extending through a slot 22 in the arm and having a head 23 engaging the left-hand side of the arm. The movement of this plunger toward the right to open the switch 2 is delayed by a suitable delay action device, such as the dash pot 24 having a piston 25 connected to the plunger 20 movable therein, and filled with a fluid, the movement of which from one side of the piston to the other is controlled by a by-pass 26 having an adjustable pointed valve 27 therein to control the size of the by-pass orifice and vary the action of the dash pot.

The means for moving the plunger to switch opening position may comprise a lever 28 pivoted intermediate its ends at 29 and having its lower rounded end located between spaced shoulders 30 on the plunger 20. The upper arm of the lever is pivotally connected to a sleeve 31 slidable on a second plunger 32, this sleeve being urged by a spring 33, having its opposite ends bearing, respectively, on the sleeve and on an abutment 34 at the right hand end of the plunger, against an abutment 35 on the plunger. The left-hand end of the plunger forms an armature extending into the solenoid 6 in the secondary circuit II. A return spring 36 of less strength than the spring 33 returns the plunger to the left when the spring 33 is not in tension, i. e., when the solenoid 6 is deenergized.

At each closing of the secondary circuit II, the spring 33 is tensioned by movement of the armature and plunger 32 to the left into the solenoid 6, but in normal operation the secondary circuit is opened at the switch 5 before the dash pot controlled plunger has moved appreciably in its switch opening movement. After each such normal closing and opening of the secondary circuit, the plunger 20 is returned to its position shown in Fig. 1 by the return spring 36.

If, however, the secondary circuit II is held closed an abnormally long time, appreciably longer than the normal delayed opening of the switch 5, the switch arm 16 is moved by the plunger 20 toward its open position until the contacts 17, 17 and 18, 18 thereon are about to leave the terminal arcuate contacts 19, 19 and 20, 20 and at this time the spring 16' takes control and quickly snaps the arm to the full open position shown in dotted lines. Thus both the primary and secondary circuits are simultaneously opened and the cylinder control thereof is cut out as well as the common source of electrical energy 1 supplying these circuits. The brake cylinder is thus restored to the operator's control to apply the brakes as he sees fit and while the control circuits are so rendered inoperative, no current from the battery is being wasted.

To notify the operator of the cut-out condition of the control circuit, means may be provided to give a signal in the operator's cab when the cut-out occurs. To this end the arm 26 may be utilized to close a switch 37 in a third circuit designated III, including in series the battery 1 and a signal device, as a lamp 38, this third circuit being closed at switch 37 when the arm 16 is moved to its dotted line cut out position. The lamp apprises the operator of the condition of the control circuits, and after noticing the signal, he may then open the lamp circuit at a switch 39 provided for this purpose. Having noted the signal he may then control the brakes just as if no wheel slide protection were provided. When the train is stopped, the malfunctioning condition in the control circuits may be corrected and the cut out switch 2 is then manually moved to the closed position shown in full lines in the figure, after which the wheel slide protecting system will again be cut in.

While a specific embodiment of the invention has been herein described in detail it will be understood that changes and modifications may be made by those skilled in the art, without departing from the main features of the invention, and such changes and modifications are intended to be covered by the appended claims.

What is claimed is:

1. In a brake control device, a brake cylinder having means for supplying it with pressure fluid under an operator's control, means responsive to wheel slip for reducing the brake cylinder pressure to prevent the wheel from reaching a sliding state and holding said pressure reduced a predetermined time sufficient to allow the wheel to regain substantially its normal speed after slipping, said means including a common source of electrical energy and primary and secondary circuits including said source, the primary circuit being adapted to be closed incident to wheel slip, means actuated by the closing of said primary circuit to close said secondary circuit and to hold it closed said predetermined time, safety means comprising a cut-out switch operative to open both said circuits, means for delaying the opening of said switch after the closure of said secondary circuit for a period appreciably longer than said predetermined time, and means for holding said cut-out switch open with the wheel slip responsive means rendered inoperative to control the brake cylinder pressure until the cut-out switch is manually restored to closed position at any time after the condition that caused the prolonged closure of the secondary circuit has been corrected.

2. In a brake control device, a brake cylinder having means for supplying it with pressure fluid under an operator's control, means responsive to wheel slip for reducing the brake cylinder pressure to prevent the wheel from reaching a sliding state and holding said pressure reduced a predetermined time sufficient to allow the wheel to regain substantially its normal speed after slipping, said means including a source of electrical energy and primary and secondary circuits each including said source, the primary circuit being adapted to be closed incident to wheel slip, means actuated by the closing of said primary circuit to close said secondary circuit and hold it closed a predetermined time, safety means comprising a cut-out switch operative to open at least said secondary circuit, means for delaying the opening of said switch after the closure of said secondary circuit for a period appreciably longer than said predetermined time, as in the case of a short circuiting of either of said circuits, and means for holding the cut-out switch open with the wheel slip responsive means rendered inoperative to control the brake cylinder pressure, said wheel slip responsive means being restorable to operative condition by the closure of the cut out switch at any time after the condition that caused the prolonged closure of the secondary circuit has been corrected.

3. In a brake control device, a brake cylinder having means for supplying it with pressure fluid under an operator's control, means responsive to wheel slip for reducing the brake cylinder pressure to prevent the wheel from reaching a sliding state and holding said pressure reduced a predetermined time sufficient to allow the wheel to regain substantially its normal speed after slipping, said means including a source of electrical energy and primary and secondary circuits each including said source, the primary circuit being adapted to be closed incident to wheel slip, means actuated by the closing of said primary circuit to close said secondary circuit and hold it closed a predetermined time, safety means comprising a cut-out switch operative to open at least one of said circuits, means for delaying the opening of said one of said circuits for a period appreciably longer than said predetermined time, as in the event of a short circuiting of either of said circuits, and means for holding the cut-out switch open with the wheel slip responsive means rendered inoperative to control the brake cylinder pressure, said wheel slip responsive means being restorable to operative condition by the closure of the cut-out switch at any time after the condition that caused the prolonged closure of the secondary circuit has been corrected.

4. In a brake control device, a brake cylinder having means for supplying it with pressure fluid under an operator's control, means responsive to wheel slip for reducing the brake cylinder pressure to prevent the wheel from reaching a sliding state and holding said pressure reduced a predetermined time sufficient to allow the wheel to regain substantially its normal speed after slipping, said means including a source of electrical energy and primary and secondary circuits each including said source, the primary circuit being adapted to be closed incident to wheel slip, means actuated by the closing of said primary circuit to close said secondary circuit and maintain it closed a predetermined time, safety means comprising a cut-out switch operative to open at least one of said circuits, means for delaying the opening of said one of said circuits for a period appreciably longer than said predetermined time as in the event of a short circuiting of either of said circuits, and means for holding said cut-out switch open with the wheel slip responsive means rendered inoperative to control the brake cylinder pressure, and a signal circuit including a signal device energized by the opening of said cut-out switch to notify the operator of the condition of the wheel slip responsive means.

CAROLUS L. EKSERGIAN.

REFERENCES CITED

The following references are of record in the file of this patent:

UNITED STATES PATENTS

| Number | Name | Date |
|---|---|---|
| 2,039,701 | Bush | May 5, 1936 |
| 2,198,032 | Farmer | Apr. 23, 1940 |
| 2,232,752 | Wilson | Feb. 25, 1941 |